United States Patent
Kobayashi et al.

(10) Patent No.: US 8,964,313 B2
(45) Date of Patent: Feb. 24, 2015

(54) PLASTIC OPTICAL ELEMENT AND METHOD OF MAKING THE SAME

(75) Inventors: Daigo Kobayashi, Tokyo (JP); Wataru Kikuchi, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/988,500

(22) PCT Filed: Nov. 10, 2011

(86) PCT No.: PCT/JP2011/076470
§ 371 (c)(1),
(2), (4) Date: May 20, 2013

(87) PCT Pub. No.: WO2012/070456
PCT Pub. Date: May 31, 2012

(65) Prior Publication Data
US 2013/0242406 A1    Sep. 19, 2013

(30) Foreign Application Priority Data
Nov. 24, 2010   (JP) ................. 2010-261604

(51) Int. Cl.
G02B 7/02   (2006.01)
G02B 3/00   (2006.01)
B29B 11/00  (2006.01)
B29D 11/00  (2006.01)

(52) U.S. Cl.
CPC .. *G02B 3/00* (2013.01); *G02B 7/02* (2013.01); *B29D 11/0073* (2013.01)
USPC ............................ 359/811; 264/1.7; 264/1.1

(58) Field of Classification Search
CPC .... G02B 7/02; G02B 7/028; B29D 11/00009; B29D 11/00403; B29D 11/0073; B29C 45/15
USPC ............. 264/1.1, 1.7, 259; 359/811, 738, 796
See application file for complete search history.

(56) References Cited

U.S. PATENT DOCUMENTS

| | | | |
|---|---|---|---|
| 4,785,053 A | 11/1988 | Ito et al. | |
| 6,327,415 B1 | 12/2001 | Koyano et al. | |
| 2007/0160831 A1 | 7/2007 | Hsieh et al. | |
| 2008/0100921 A1 | 5/2008 | Nishikawa et al. | |

FOREIGN PATENT DOCUMENTS

| | | |
|---|---|---|
| DE | 102008034153 A1 | 1/2010 |
| EP | 2402140 A1 | 1/2012 |

(Continued)

OTHER PUBLICATIONS

NPL International Search Report (PCT/ISA/210) prepared for PCT/JP2011/076470 (May 2013).*

(Continued)

*Primary Examiner* — David N Spector
(74) *Attorney, Agent, or Firm* — Canon U.S.A., Inc. IP Division

(57) ABSTRACT

To provide a plastic optical element with reduced birefringence.

An angle formed by a line segment that connects a gate corresponding part of a core lens to the center of the core lens and a line segment that connects a gate corresponding part of a molded portion to the center of the core lens is greater than or equal to 90 degrees and is less than or equal to 180 degrees when viewed in a direction along the optical axis of the plastic optical element.

8 Claims, 10 Drawing Sheets

(56) References Cited

FOREIGN PATENT DOCUMENTS

| | | | |
|---|---|---|---|
| EP | 2 666 619 A1 * | 11/2013 | |
| JP | S57-72822 A | 5/1982 | |
| JP | S60-054822 A | 3/1985 | |
| JP | 60-097301 A | 5/1985 | |
| JP | 63-315216 A | 12/1988 | |
| JP | H04-185105 A | 7/1992 | |
| JP | H06-335939 A | 12/1994 | |
| JP | 8-187793 A | 7/1996 | |
| JP | H08-190004 A | 7/1996 | |
| WO | WO 2012/070456 A1 * | 5/2012 | |

OTHER PUBLICATIONS

NPL Written Opinion of the International Searching Authority (PCT/ISA/237) prepared for PCT/JP2011/076470 (May 2013).*
NPL English-Language translation of Japanese Patent Publication JP H08-187793 A (obtained from http://www.ipdl.inpit.go.jp/homepg_e, ipd on Apr. 22, 2014).*
U.S. Appl. No. 13/898,274, filed May 20, 2013, Wataru Kikuchi.
U.S. Appl. No. 13/898,316, filed May 20, 2013, Daigo Kobayashi.

* cited by examiner

FIG. 4A
FIG. 4B
FIG. 4C
FIG. 4D
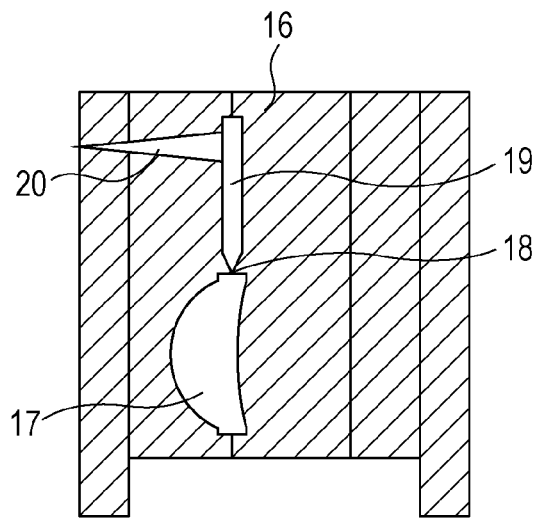
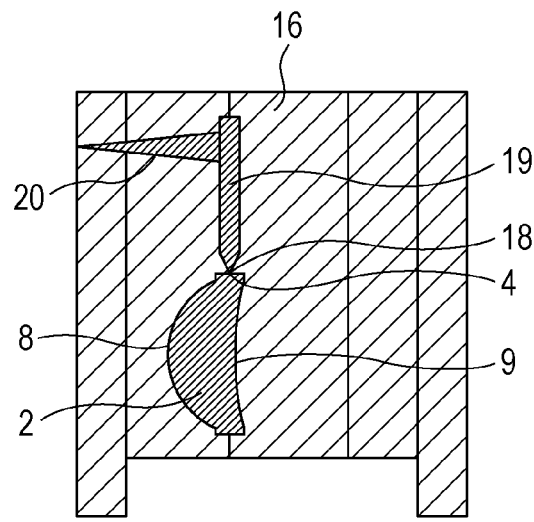
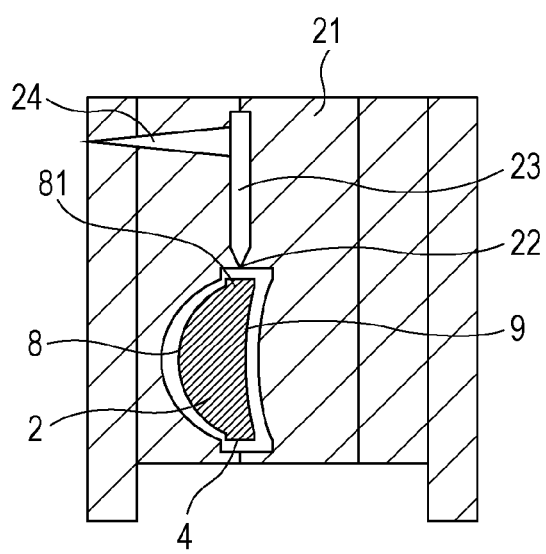
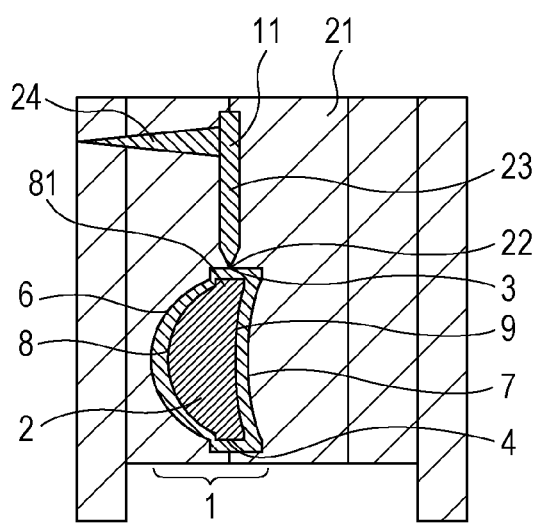

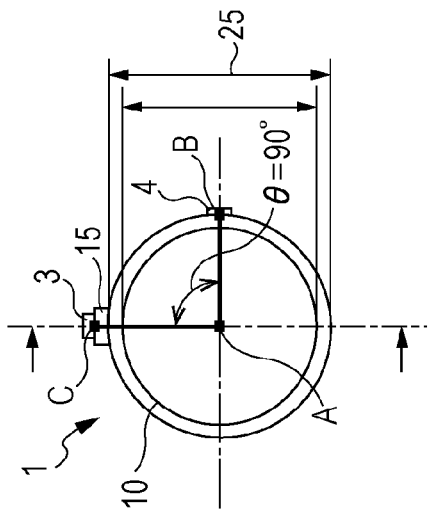
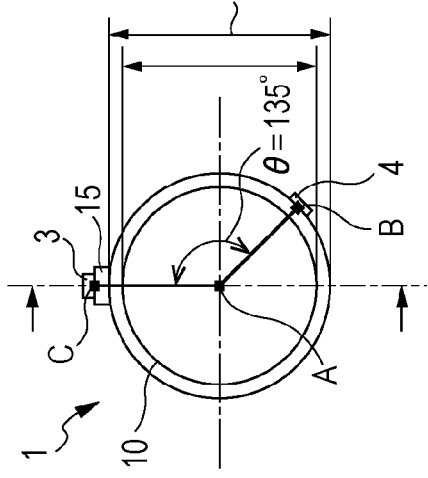
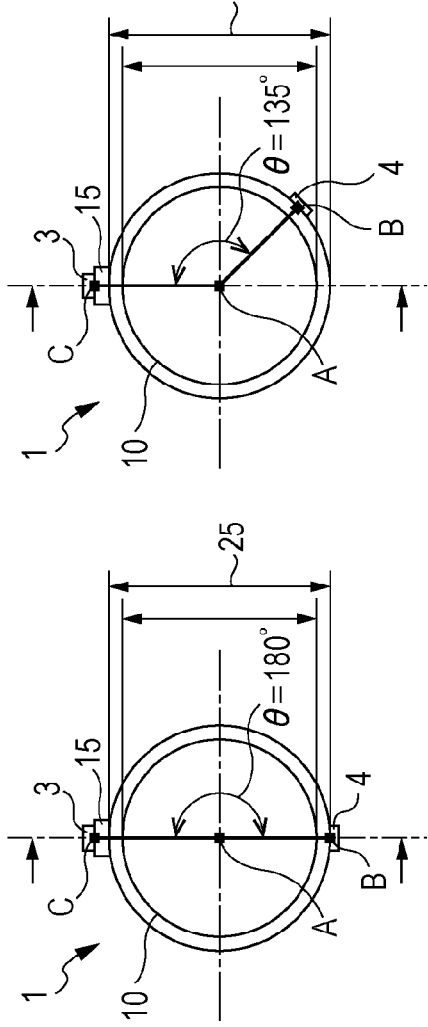
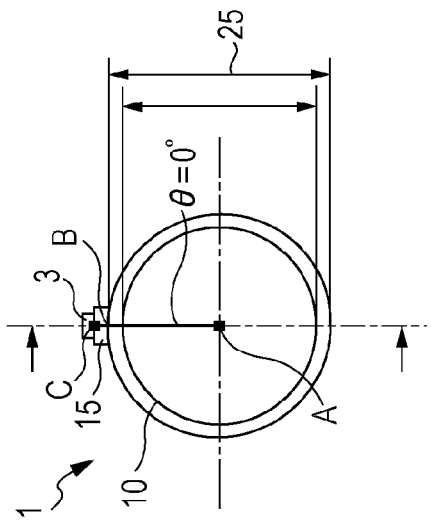
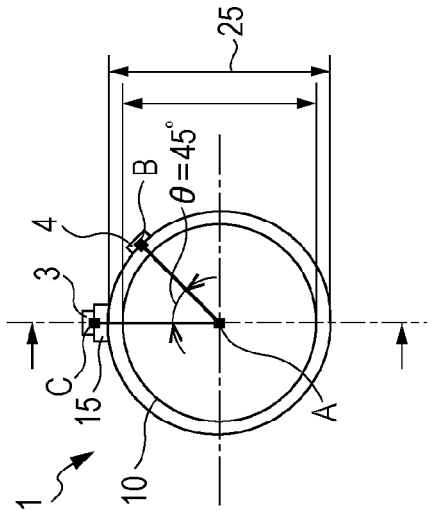

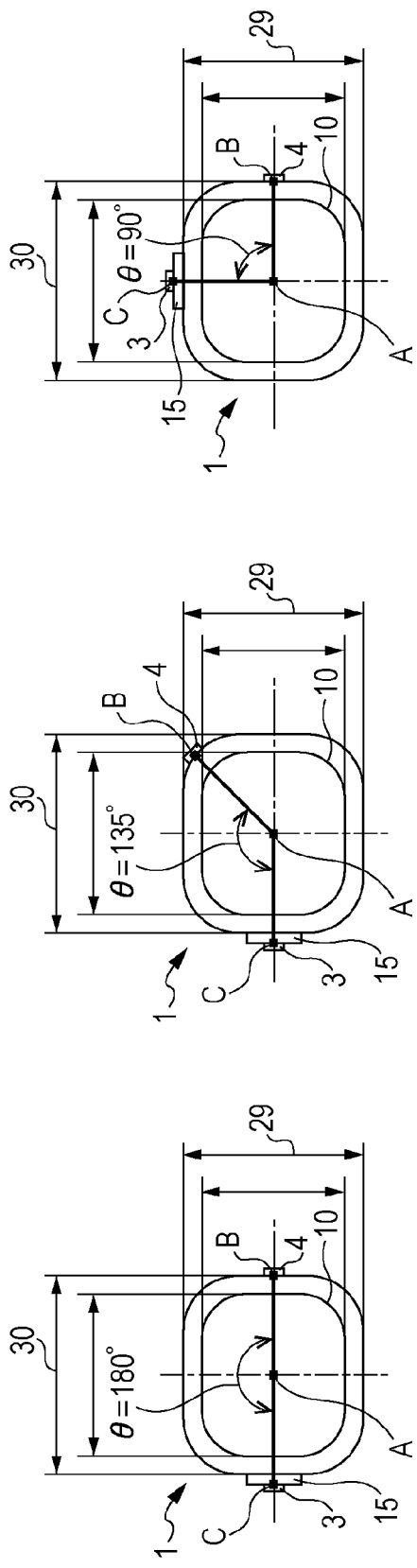

PLASTIC OPTICAL ELEMENT AND METHOD OF MAKING THE SAME

TECHNICAL FIELD

The present invention relates to a plastic optical element included in an optical apparatus, such as a digital camera or a copier, and a method of making the same.

BACKGROUND ART

In recent years, there has been growing demand for making a thick optical element by injection molding. An increase in thickness of a plastic optical element leads to an increase in stress caused by the difference in shrinkage on curing between a surface plastic layer that cures first during molding and an inner plastic portion that cures subsequently. Disadvantageously, this causes a vacuum bubble (void) in the optical element or allows inner stress to remain therein. Furthermore, since the time required to cool such a thick optical element in a mold drastically becomes long due to the increase in thickness, a molding cycle markedly increases.

To overcome the above-described disadvantages, PTL 1 discloses a method of making a plastic optical element including a plastic core lens internally disposed and plastic coatings which cover front and rear optical surfaces of the core lens such that the core lens is integrated with the plastic coatings.

In a typical optical element made by injection molding, shear stress occurs upon injection to induce unidirectional alignment of a polymer chain in a material to be molded, thus causing optical anisotropy. This optical anisotropy caused by the polymer chain alignment is called birefringence, which reduces the light gathering power of a lens.

The method disclosed in PTL 1 has a disadvantage in that birefringence in the core lens is combined with that in the plastic coating on each surface of the core lens such that the resultant birefringence is worse than birefringence in an optical element produced by typical injection molding.

CITATION LIST

Patent Literature
PTL 1 Japanese Patent Laid-Open No. 8-187793

SUMMARY OF INVENTION

According to an aspect of the present invention, a plastic optical element includes a core lens and a molded portion, serving as a plastic coating, disposed on the surface of the core lens, wherein an angle formed by a line segment that connects a gate corresponding part of the core lens to the center of the core lens and a line segment that connects a gate corresponding part of the molded portion to the center of the core lens is greater than or equal to 90 degrees and is less than or equal to 180 degrees when viewed in the optical axis direction of the plastic optical element.

According to another aspect of the present invention, a method of making a plastic optical element including a core lens and a plastic coating disposed on the surface of the core lens, the method including pouring plastic into a cavity through a gate to mold the core lens, and pouring plastic from a position to coat the surface of the core lens with the plastic that serves as the plastic coating, the position being located such that an angle formed by a line segment that connects the position to the center of the core lens when viewed in the optical axis direction of the core lens and a line segment that connects the center of the core lens to a gate corresponding part of the core lens when viewed in the optical axis direction is greater than or equal to 90 degrees and is less than or equal to 180 degrees.

According to these aspects of the present invention, the plastic optical element can be provided which has reduced birefringence obtained by making the positions of gates for the core lens and the plastic coating different from each other.

Further features of the present invention will become apparent from the following description of exemplary embodiments with reference to the attached drawings.

BRIEF DESCRIPTION OF DRAWINGS

FIGS. 4A to 4D are diagrams illustrating a method of making the plastic optical element according to the first embodiment.

FIGS. 7A to 7E are diagrams illustrating composite plastic optical elements according to Example 1 and Comparative Example 1.

FIGS. 9A to 9E are diagrams explaining composite plastic optical elements according to Example 2 and Comparative Example 2.

DESCRIPTION OF EMBODIMENTS

First Embodiment

A plastic optical element according to a first embodiment of the present invention and a method of making the same will be described.

Figure 1A:
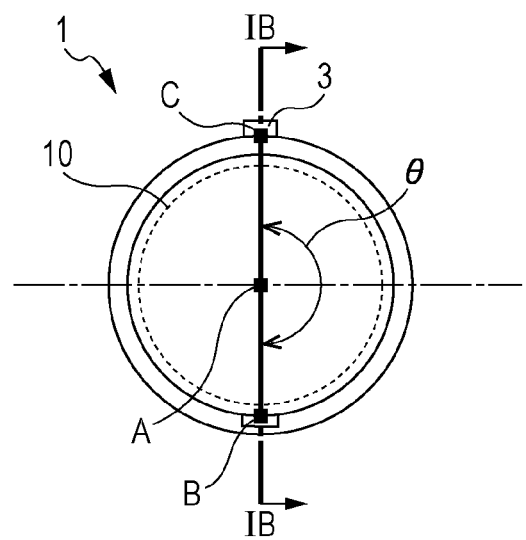
FIGS. 1A and 1B are diagrams illustrating a plastic optical element according to a first embodiment of the present invention.
Figure 1B:
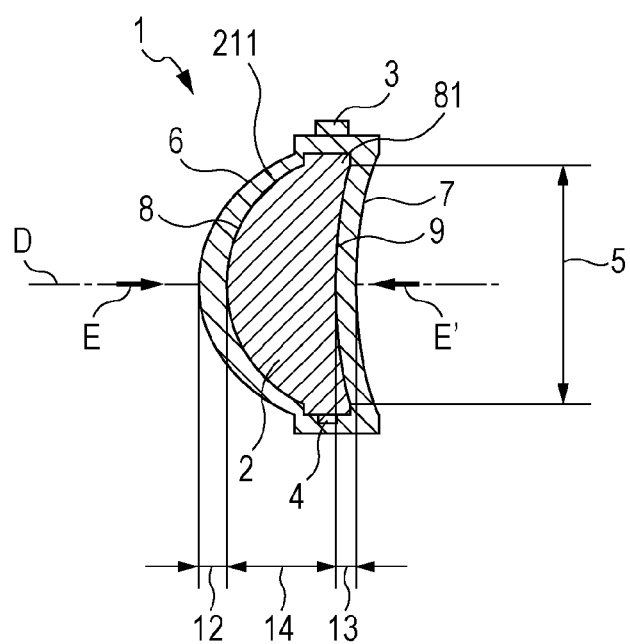
Figure 2A:
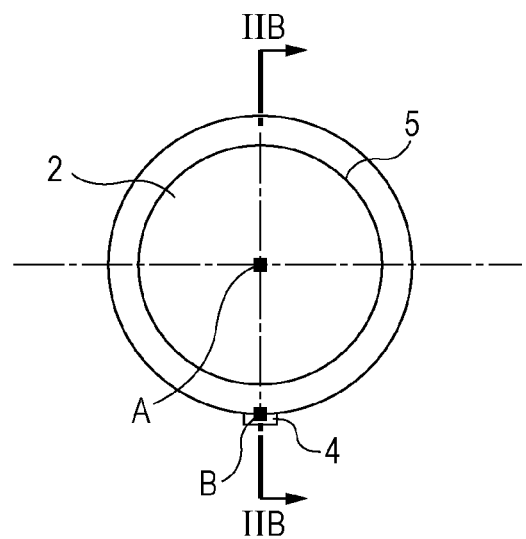
FIGS. 2A and 2B are diagrams illustrating a core lens in the first embodiment.
Figure 2B:
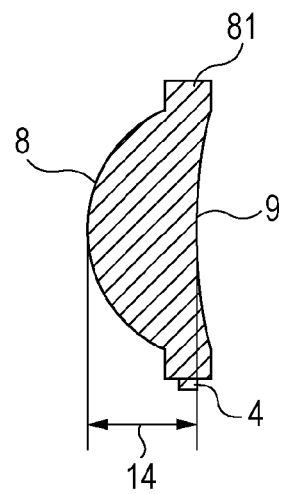

The plastic optical element according to the present embodiment will now be described with reference to FIGS. 1A and 1B. FIG. 1A is a plan view of the plastic optical element when viewed in a direction along its optical axis (also referred to as the "optical axis direction") and FIG. 1B is a cross-sectional view thereof taken along the line IB-IB in FIG. 1A. The plastic optical element according to this embodiment includes a core lens 2 and a molded portion 211, serving as a plastic coating, disposed on the core lens 2. FIGS. 2A and 2B are diagrams explaining the core lens 2. FIG. 2A is a plan view of the core lens 2 when viewed in the optical axis direction and FIG. 2B is a cross-sectional view thereof taken along the line IIB-IIB in FIG. 2A. The same parts and components in FIGS. 2A and 2B as those in FIGS. 1A and 1B are designated by the same reference numerals and the parts and components will be described.

In FIGS. 1A to 2B, reference numeral 1 denotes the plastic optical element; 2 the core lens; 211 the molded portion serving as the plastic coating; 3 a gate corresponding part of the molded portion 211; 4 a gate corresponding part of the core lens 2; and 5 an optical effective area of the core lens 2.

The core lens 2 is a glass or plastic molded component and may be a component made by injection-molding transparent plastic. Alternatively, a lens including a glass base or a transparent plastic base and a molded transparent plastic coating disposed on the base can be used as the core lens 2. Examples of the transparent plastic include polycarbonate, cycloolefin polymer, α-olefin-cycloolefin copolymer, polystyrene, styrene-methyl methacrylate copolymer, fluorene polyester, and methyl methacrylate.

Furthermore, the term "plastic optical element" means an element that includes a core lens and a molded portion, serving as a plastic coating, disposed on the surface of the core lens. The plastic coating comprises transparent plastic. Examples of the transparent plastic include polycarbonate, cycloolefin polymer, α-olefin-cycloolefin copolymer, polystyrene, styrene-methyl methacrylate copolymer, fluorene polyester, and methyl methacrylate. The plastic optical element is configured such that the surface of the core lens is coated with such transparent plastic, molded into the molded portion by, for example, injection molding, and the molded portion is integrated with the core lens. As regards plastic of the core lens and that of the plastic coating of the molded portion, the same material may be used or different materials may be used.

An optical surface 6 of the plastic optical element 1 is formed by the molded portion 211 disposed on the surface of the core lens 2. In this specification, this optical surface 6 will be called a first optical surface of the plastic optical element 1. An optical surface 7 of the plastic optical element 1 is formed by the molded portion 211 disposed on the surface of the core lens 2. In this specification, this optical surface 7 will be called a second optical surface of the plastic optical element 2. An optical surface 8 of the core lens 2 will be called a first optical surface of the core lens in this specification. An optical surface 9 of the core lens 2 will be called a second optical surface of the core lens in this specification. A side surface 81 of the core lens 2 will be called a non-optical surface of the core lens in this specification.

Reference numeral 10 denotes an optical effective area of the plastic optical element 1. D denotes the optical axis of the plastic optical element 1 and that of the core lens 2. Reference numerals 12 and 13 each denote the thickness of the molded portion 211 on the surface of the core lens 2 along the optical axis and reference numeral 14 denotes the thickness of the core lens along the optical axis. A denotes the center of the core lens 2 when viewed in the optical axis direction (in a direction indicated by the arrow E or E'), B denotes any position in the gate corresponding part 4 of the core lens 2 when viewed in the optical axis direction, and C denotes any position of the gate corresponding part 3 of the molded portion 211 of the plastic optical element 1 when viewed in the optical axis direction. Each gate corresponding part is a resin supply part of a molded component and indicates a surface part of the molded component positioned at an injection port (gate) provided for a mold in order to pour resin into a cavity. In FIGS. 1A to 2B, the gate corresponding part 3 of the molded portion 211 disposed on the surface of the core lens 2 and the gate corresponding part 4 of the core lens 2 are depicted as projections for convenience. The gate corresponding parts may be recesses. Furthermore, the amount of projection of each gate, the shape of the gate, and a gate cutting process are not especially limited. In the case where the gate corresponding part 3 of the molded portion 211 and the gate corresponding part 4 of the core lens 2 are projections, the volume of each projection can be reduced as much as possible.

In the plastic optical element 1 according to this embodiment, an angle θ formed by a line segment AB that connects the gate corresponding part 4(B) of the core lens 2 to the center A of the core lens 2 and a line segment AC that connects the gate corresponding part 3(C) of the molded portion 211 to the center A of the core lens 2 is greater than or equal to 90 degrees and is less than or equal to 180 degrees when viewed in the optical axis direction E (or E'). In this specification, a smaller angle of the angles formed by the line segment AB that connects the gate corresponding part 4(B) of the core lens 2 to the center A of the core lens 2 and the line segment AC that connects the gate corresponding part 3(C) of the molded portion 211 to the center A of the core lens 2 will be called a formed angle θ.

Furthermore, the position B may be any position in the gate corresponding part 4 of the core lens 2 and can be at the center of the gate corresponding part 4 of the core lens. The position C may be any position in the gate corresponding part 3 of the molded portion 211 and can be at the center of the gate corresponding part 3 of the molded portion. Assuming that the shape of each gate corresponding part is a circle when viewed in the optical axis direction, the center of the gate corresponding part is defined as the center of the circle. In the case where the gate corresponding part has any shape other than a circle, the center of the gate corresponding part is defined as the gravity thereof when viewed in the optical axis direction.

In this embodiment, the plastic optical element has a shape like that of a meniscus lens. The present invention is not limited to this shape. The present invention can be widely applied to optical elements, e.g., various lenses, such as a convex lens, a concave lens, a cylindrical lens, an fθ lens, and a Fresnel lens.

FIGS. 4A to 4D illustrate the method of making the plastic optical element according to this embodiment. The same parts and components as those in FIGS. 1A to 2B are designated by the same reference numerals and detailed description of the parts and components are omitted. FIGS. 4A to 4D are cross-sectional views of molds in this embodiment. Reference numeral 16 denotes a mold for injection-molding the core lens; 17 a cavity; 18 a gate; 19 a runner; and 20 a sprue. In addition, reference numeral 21 denotes a mold for molding the plastic optical element; 22 a gate; 23 a runner; and 24 a sprue.

First, molten plastic is poured into the cavity 17 of the mold 16 for injection-molding the core lens through the sprue 20, the runner 19, and the gate 18 as illustrated in FIG. 4A, thus producing the core lens 2 (refer to FIG. 4B). At this time, the core lens 2 includes the gate corresponding part 4 in a position corresponding to the gate 18. Subsequently, the core lens 2 is inserted into the mold 21 for molding the plastic optical element, as illustrated in FIG. 4C, using a known positioning mechanism or the like. As regards the known positioning mechanism, for example, a method of holding an area other than the optical effective area of the core lens using an ejector pin, or a method of holding such an area such that the area directly abuts against the mold may be used.

In the mold 21 for molding the plastic optical element, when plastic for coating is poured, the gate is positioned such that the formed angle θ is greater than or equal to 90 degrees and is less than or equal to 180 degrees. Specifically, the gate is positioned such that the angle θ formed by the line segment that connects the gate corresponding part 4 of the core lens 2 to the center of the core lens and the line segment that connects the gate to the center of the core lens is greater than or equal to 90 degrees and is less than or equal to 180 degrees when viewed in the optical axis direction of the core lens to be inserted into the cavity. FIGS. 4C and 4D illustrate the case where the formed angle θ is 180 degrees. Molten plastic is poured through the sprue 24, the runner 23, and the gate 22 as illustrated in FIG. 4D such that the plastic simultaneously runs onto both surfaces (the first optical surface 8 and the second optical surface 9) of the core lens 2. Consequently, the combination of birefringence that occurs near the gate corresponding part 4 of the core lens and birefringence that occurs near the gate corresponding part 3 of the molded portion is suppressed. Thus, the plastic optical element 1 with reduced birefringence is obtained.

The shape of each optical surface of the obtained plastic optical element 1 may be, for example, a spherical surface, an aspherical surface, or a free-form surface, namely, it is not especially limited. In the optical effective area 10 of at least the plastic optical element, the shape of the first optical surface 8 of the core lens 2 can be substantially similar to that of the first optical surface 6 of the plastic optical element 1. Furthermore, the shape of the second optical surface 9 of the core lens 2 may be substantially similar to that of the second optical surface 7 of the plastic optical element 1. Moreover, in at least the optical effective area 10, the thickness of the molded portion, serving as the plastic coating, indicated at 11, disposed on the first optical surface 8 of the core lens 2 and the second optical surface 9 thereof may be substantially uniform. In addition, in at least the optical effective area 10, as regards the relationship between the thickness 14 of the core lens 2 along an axis parallel to the optical axis and the thicknesses 12 and 13 of the plastic coating 11, the thickness of the core lens 2 may be greater than or equal to the sum of the thicknesses of the plastic coating. The above-described conditions can reduce deformation of the plastic optical element 1 caused by shrinkage after molding.

In this embodiment of the present invention, the angle θ formed by the line segment AB that connects the gate corresponding part 4 of the core lens 2 to the center A of the core lens and the line segment AC that connects the gate corresponding part 3 of the molded portion 211 to the center A of the core lens is set in the range of 90 degrees to 180 degrees. The present invention has found that such angle setting can reduce birefringence. In an optical element made by injection molding, a large shear stress acts on a gate corresponding part of the optical element, so that birefringence deteriorates. If the formed angle θ is set in the range of 0 degrees to 90 degrees, birefringence that occurs near the gate corresponding part of the core lens will combine with birefringence that occurs near the gate corresponding part of the molded portion. Consequently, the birefringence of a composite plastic optical element increases. Disadvantageously, the optical performance of the plastic optical element is deteriorated. Whereas, in the case where the formed angle θ is set in the range of 90 degrees to 180 degrees, the effect of the combination of the birefringences near the gate corresponding parts is suppressed, so that the effect of the birefringences can be reduced. In particular, when the formed angle θ is 180 degrees, the effect of the birefringences can be most effectively prevented. In the plastic optical element 1 according to this embodiment, the formed angle θ is set in the range of 90 degrees to 180 degrees when viewed in the optical axis direction. Consequently, the combination of the birefringence that occurs near the gate corresponding part 4 of the core lens 2 and the birefringence that occurs near the gate corresponding part 3 of the molded portion 211 is suppressed. Advantageously, an optical lens with reduced birefringence can be provided.

This embodiment has been described with respect to the case where each of the shape of the core lens 2 and that of the plastic optical element 1 is circular when viewed in the optical axis direction. The present invention is not limited to this case. The shape when viewed in the optical axis direction may be elliptical, oval like a koban (Japanese old gold coin), or polygonal.

Figure 3:
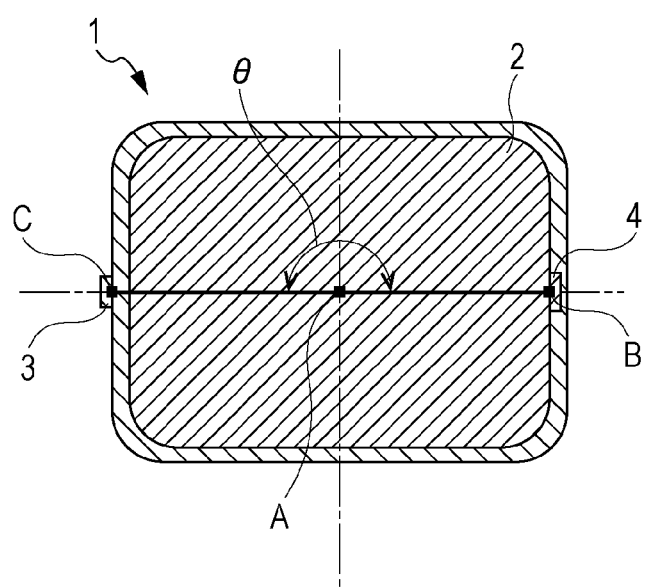
FIG. 3 is a diagram illustrating a plastic optical element according to a modification of the first embodiment.

FIG. 3 illustrates a plastic optical element according to a modification of the first embodiment. FIG. 3 illustrates a section of the plastic optical element cut along the plane orthogonal to the optical axis when viewed in the optical axis direction. Referring to FIG. 3, the plastic optical element is a rectangle with rounded corners. In this specification, this shape will be called a rounded rectangle. FIG. 3 illustrates the plastic optical element 1 in which the formed angle θ is 180 degrees. As long as the formed angle θ ranges from 90 degrees to 180 degrees, the advantages of the present invention can be achieved. Furthermore, in FIG. 3, the gate corresponding part 4(B) of the core lens 2 and the gate corresponding part 3(C) of the molded portion of the plastic optical element 1 are arranged on short sides of the rounded rectangle, respectively. In the case where the shape of the plastic optical element 1 when viewed in the optical axis direction is not circular, a plurality of gates may be arranged relative to the formed angle θ. The gates can be arranged such that the length of the line segment BC is long as illustrated in FIG. 3.

Second Embodiment

A plastic optical element according to a second embodiment of the present invention and a method of making the same will be described below.

Figure 5A:
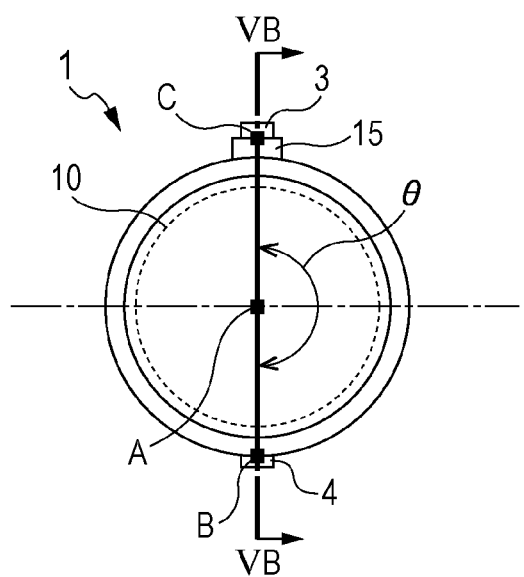
FIGS. 5A and 5B are diagrams illustrating a plastic optical element according to a second embodiment of the present invention.
Figure 5B:
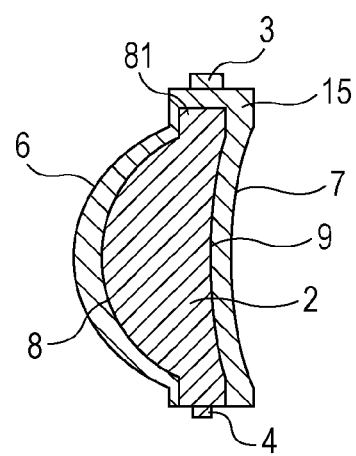

FIG. 5A is a plan view of the plastic optical element according to this embodiment when viewed in the optical axis direction. FIG. 5B is a cross-sectional view thereof taken along the line VB-VB in FIG. 5A. The same parts and components as those in FIGS. 1A to 2B are designated by the same reference numerals and detailed description thereof is omitted. A rib 15 for divergent coating is provided for the gate corresponding part of the molded portion of the plastic optical element 1 in order to pour plastic for coating into the cavity. In this embodiment, the angle θ formed by the line segment AB and the line segment AC is set in the range of 90 degrees to 180 degrees when viewed in the optical axis direction in a manner similar to the plastic optical element 1 according to the first embodiment. Consequently, the combination of birefringence that occurs near the gate corresponding part 4 of the core lens 2 and birefringence that occurs near the gate corresponding part 3 of the molded portion is suppressed. Advantageously, the optical element, such as a lens, with reduced birefringence can be provided. The placement of the divergent coating rib 15 allows plastic for coating the surfaces of the core lens 2 to be simultaneously inserted in both of a direction to the first optical surface 8 and a direction to the second optical surface 9. Accordingly, the time required for insertion can be reduced and the core lens 2 can be prevented from deforming due to resin pressure applied upon inserting the plastic for coating. In addition, the placement of the rib 15 allows the outer diameter of the plastic optical element 1 excluding the rib to be substantially the same as that of the core lens 2.

The method of making the plastic optical element 1 according to this embodiment is illustrated in FIGS. 6A to 6D. FIGS. 6A to 6D are cross-sectional views of molds in this embodiment. The same parts and components as those in FIGS. 4A to 4D are designated by the same reference numerals and detailed description thereof is omitted.

Figure 6A:
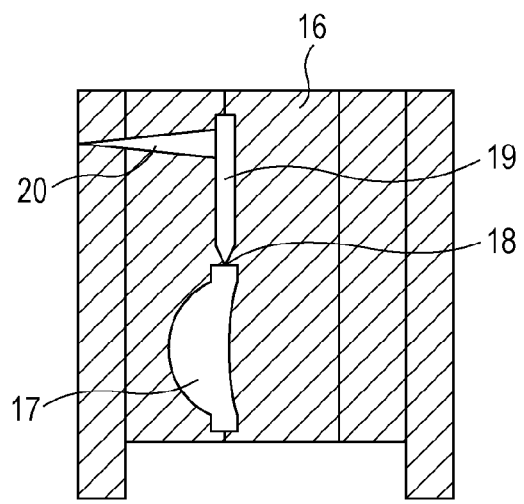
FIGS. 6A to 6D are diagrams illustrating a method of making the plastic optical element according to the second embodiment.
Figure 6B:
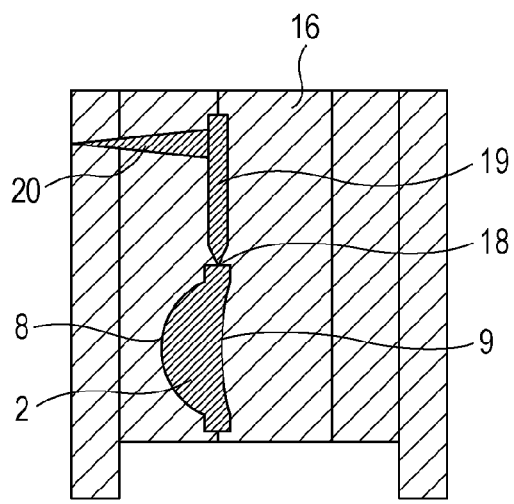
Figure 6C:
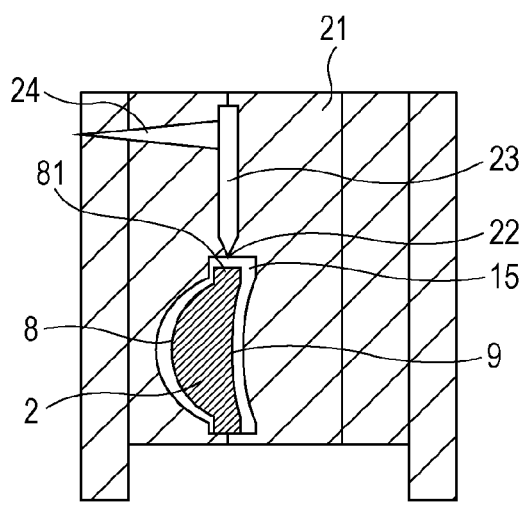
Figure 6D:
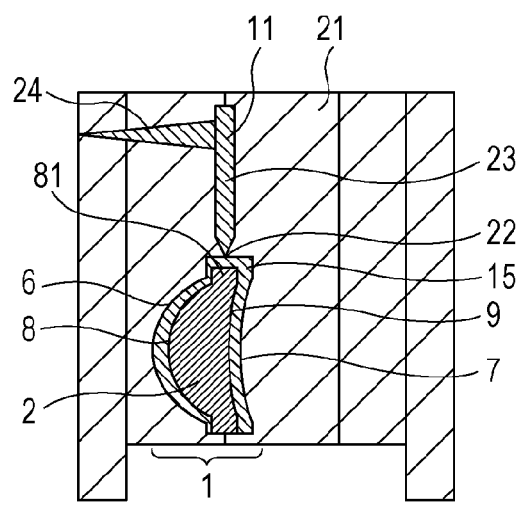

First, molten plastic is poured into the cavity 17 of the mold 16 for injection-molding the core lens through the sprue 20, the runner 19, and the gate 18 as illustrated in FIG. 6A, thus producing the core lens 2 as illustrated in FIG. 6B. Subsequently, the core lens 2 is inserted into the mold 21 for molding the plastic optical element, as illustrated in FIG. 6C, using a positioning mechanism (not illustrated). In the mold 21 for molding the plastic optical element, when plastic for coating is poured into the mold, the gate is positioned such that the formed angle θ is greater than or equal to 90 degrees and is less than or equal to 180 degrees after molding the plastic optical element. The plastic is poured through the sprue 24, the runner 23, the gate 22, and the divergent coating rib 15 as illustrated in FIG. 6D such that the plastic simultaneously runs onto the first optical surface 8 and the second optical surface 9 of the core lens 2.

Consequently, the combination of birefringence that occurs near the gate corresponding part 4 of the core lens 2 and birefringence that occurs near the gate corresponding part 3 of the molded portion, serving as the plastic coating, is suppressed. Thus, the plastic optical element 1 with reduced birefringence is obtained. Furthermore, the placement of the divergent coating rib 15 allows resin to be simultaneously inserted in both of the direction to the first optical surface 8 and the direction to the second optical surface 9. Accordingly, the time required for insertion can be reduced and the core lens can be prevented from deforming due to resin pressure applied upon inserting the plastic for coating. In addition, the placement of the rib 15 allows the outer diameter of the plastic optical element 1 excluding the rib to be substantially the same as that of the core lens 2.

The shape of each optical surface may be, for example, a spherical surface, an aspherical surface, or a free-form surface, namely, it is not especially limited. Furthermore, the shape of the first optical surface 8 of the core lens 2 can be substantially similar to that of the first optical surface 6 of the plastic optical element 1 in a manner similar to the first embodiment. In addition, the shape of the second optical surface 9 of the core lens 2 can be substantially similar to that of the second optical surface 7 of the plastic optical element 1. Moreover, in at least the optical effective area 10, the thickness of the molded portion, serving as the plastic coating, disposed on the first and second optical surfaces 8 and 9 of the plastic core lens 2 may be substantially uniform. In addition, in at least the optical effective area, the thickness of the plastic core lens 2 along an axis parallel to the optical axis may be greater than or equal to the sum of the thickness of the molded portion, serving as the plastic coating, on the first optical surface of the core lens and that on the second optical surface thereof. The above-described conditions can advantageously reduce deformation of a composite plastic optical element caused by shrinkage after molding.

While the embodiments of the present invention have been described, the present invention is not limited to the embodiments. For example, the surface of the plastic coating disposed on each surface of the core lens may be coated with a second plastic coating. Furthermore, a lens including a base and a molded plastic coating disposed on the surface of the base may be used as a core lens. The plastic coating and the second plastic coating may include the same material or different materials. Similarly, the base and the plastic coating may include the same material or different materials.

In the case where the surface of the plastic coating disposed on the surface of the core lens is coated with the second plastic coating, similarly, the positions of gates for the plastic coatings may be arranged such that the formed angles θ related to the gates are greater than or equal to 90 degrees and are less than or equal to 180 degrees. Specifically, the gate corresponding part of the core lens, the gate corresponding part of the molded portion, serving as the coating plastic, and a gate corresponding part of a molded portion, serving as the second plastic coating can be arranged such that each of the formed angle θ related to the gate corresponding part of the core lens and that of the molded portion, serving as the plastic coating, the formed angle θ related to the gate corresponding part of the core lens and that of the molded portion, serving as the second plastic coating, and the formed angle θ related to the gate corresponding part of the molded portion, serving as the plastic coating, and that of the molded portion, serving as the second plastic coating, is greater than or equal to 90 degrees and is less than or equal to 180 degrees. The shape of such a plastic optical element when viewed in the optical axis direction may be, for example, circular, elliptical, oval, or polygonal. The formed angles related to the gate corresponding parts can be uniform. In the case where the shape of the plastic optical element is circular, each formed angle θ can be 120 degrees.

In the case where the lens including the base and the molded plastic coating disposed on the surface of the base is used as the core lens, similarly, the positions of gates may be arranged such that the formed angle θ related to the gates are greater than or equal to 90 degrees and are less than or equal to 180 degrees. Specifically, a gate corresponding part of the base of the core lens, a gate corresponding part of a molded portion, serving as the plastic coating, of the core lens, and the gate corresponding part of the molded portion, serving as the plastic coating, can be arranged such that each of the formed angle θ related to the gate corresponding part of the base of the core lens and that of the molded portion, serving as the plastic coating, of the core lens, the formed angle θ related to the gate corresponding part of the base of the core lens and that of the molded portion, serving as the plastic coating, and the formed angle θ related to the gate corresponding part of the molded portion, serving as the plastic coating, of the core lens, and that of the molded portion, serving as the plastic coating, is greater than or equal to 90 degrees and is less than or equal to 180 degrees. The shape of such a plastic optical element when viewed in the optical axis direction may be, for example, circular, elliptical, oval, or polygonal. The formed angles related to the gate corresponding parts can be uniform. In the case where the shape of the plastic optical element is circular, each formed angle θ can be 120 degrees.

Examples of the present invention will be specifically described below. Note that the present invention is not limited to these examples.

EXAMPLE 1

In this example, plastic optical elements were made such that the formed angles θ were 180 degrees, 135 degrees, and 90 degrees, and the relationship between birefringence of each plastic optical element and the formed angle θ was determined. As regards measurement of birefringence, the following method was used. Each plastic optical element was disposed between two polarizers (a polarizer and an analyzer), a single-wavelength light beam was applied to the plastic optical element from the side adjacent to the polarizer, the plastic optical element was turned by 360 degrees about its optical axis while the polarizer and the analyzer were held in parallel nicols, and a phase shift was obtained at that time from the angular dependence of the intensity of transmitting light. Measurement was performed using an instrument manufactured by Oji Scientific Instruments.

First, the plastic optical elements were produced. The plastic optical elements were made using the method described in the second embodiment.

Figure 8A:
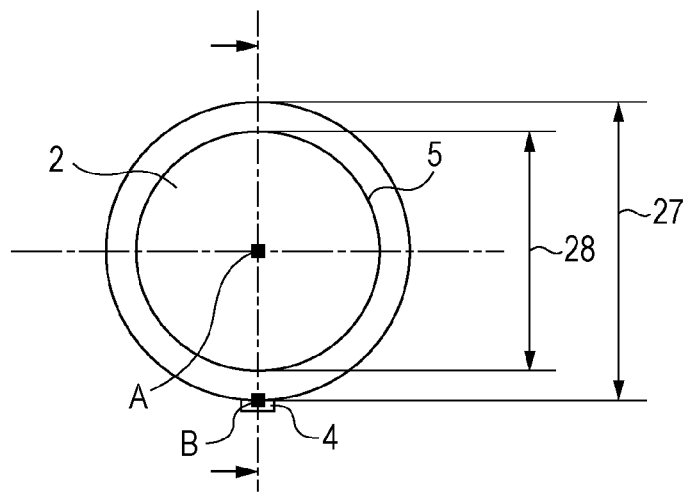
FIGS. 8A and 8B are diagrams explaining a core lens in Example 1 and Comparative Example 1.
Figure 8B:
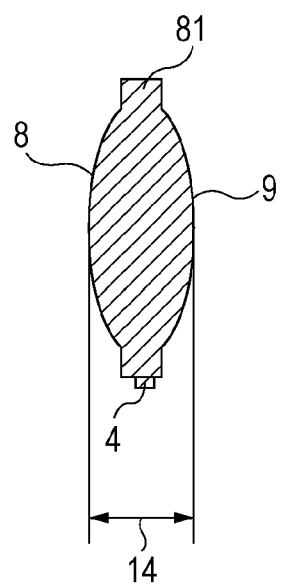

First, molten plastic for each plastic core lens was poured into a cavity of a mold for injection-molding the core lens through a sprue, a runner, and a gate. After cooling, mold opening, and ejecting, the plastic core lens was produced. FIGS. 8A and 8B illustrate the produced core lens. The same parts and components as those in FIGS. 2A and 2B are designated by the same reference numerals and detailed description thereof is omitted. Specifically, biconvex lenses were made such that each lens was circular and the outer diameter, indicated at 27, of the core lens was 16 mm, the outer diameter, indicated at 28, of an optical effective area was 14 mm, and the thickness 14 of the middle part was 6 mm.

Subsequently, each core lens was inserted into the mold for molding the plastic optical element. At this time, the positions of gates were arranged such that the angles θ formed by the line segments AB and the line segments AC in the plastic optical elements to be molded were 180 degrees, 135 degrees, and 90 degrees.

Next, plastic for coating was poured through the sprue, the runner, the gate, and the divergent coating rib such that the plastic simultaneously ran onto the first and second optical surfaces of each core lens. After cooling, mold opening, and ejecting, the plastic optical elements were made. Thus, the plastic optical elements having the angles θ, each formed by the line segment AB and the line segment AC, of 180 degrees, 135 degrees, and 90 degrees were obtained. FIGS. 7A to 7C illustrate the obtained plastic optical elements. The same parts and components as those in FIGS. 5A and 5B are designated by the same reference numerals and detailed description thereof is omitted. The outer diameters, indicated at 25, excluding the ribs of the plastic optical elements were the same as the outer diameter 27 of the core lens. In addition, each of the thicknesses of the molded portion, serving as the plastic coatings, covering the first and second optical surfaces of the core lens was 3 mm.

COMPARATIVE EXAMPLE 1

The positions of gates each located when the corresponding core lens was inserted into the mold for molding the plastic optical element were arranged such that the angles θ formed by the line segments AB and the line segments AC in the plastic optical elements to be molded were 45 degrees and 0 degrees. Regarding other conditions, the plastic optical elements were produced in the same way as Example 1.

Table 1 illustrates the relationship between the formed angles θ and birefringences in the plastic optical elements according to Example 1 and Comparative Example 1.

TABLE 1 formed angles θ and birefringences of obtained composite plastic optical elements in Example 1 and Comparative Example 1

| | Formed angle θ | | | | |
|---|---|---|---|---|---|
| | 180 degrees | 135 degrees | 90 degrees | 45 degrees | 0 degrees |
| Birefringence | Good | Good | Good | Not good | Not good |

The obtained results indicate that birefringence was good when the angle θ formed by the line segment AB and the line segment AC was greater than or equal to 90 degrees and was less than or equal to 180 degrees. Accordingly, it was found that as long as the formed angle θ is set in the range of 90 degrees to 180 degrees when viewed in the optical axis direction, a plastic optical element with good birefringence can be obtained. In Example 1 and Comparative Example 1, cycloolefin resin was used as a material for the core lenses and the plastic coatings. Any material may be used for embodying the present invention as long as the material is resin for optical application.

EXAMPLE 2

In this example, plastic optical elements, serving as rounded-rectangular meniscus lenses, were produced such that the angles θ formed by the line segments AB and the line segments AC were 180 degrees, 135 degrees, and 90 degrees. The relationship between the formed angles and birefringences in the plastic optical elements was determined. As regards measurement of birefringence, the following method was used. Each plastic optical element was disposed between two polarizers (a polarizer and an analyzer), a single-wavelength light beam was applied to the plastic optical element from the side adjacent to the polarizer, the plastic optical element was turned by 360 degrees about its optical axis while the polarizer and the analyzer were held in parallel nicols, and a phase shift was obtained at that time from the angular dependence of the intensity of transmitting light. Measurement was performed using an instrument manufactured by Oji Scientific Instruments.

The plastic optical elements were made using the method described in the second embodiment.

Figure 10A:
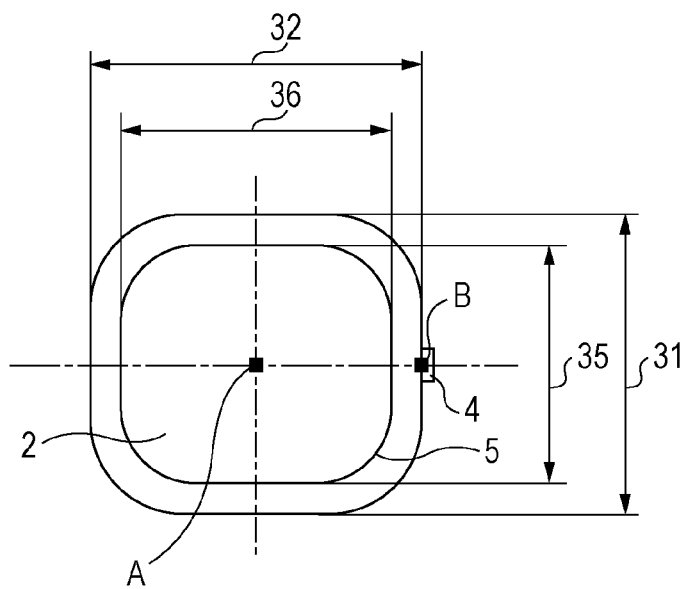
FIGS. 10A and 10B are diagrams explaining a core lens in Example 2 and Comparative Example 2.
Figure 10B:
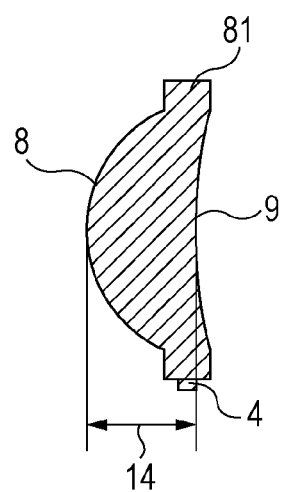

First, molten plastic for each plastic core lens was poured into a cavity of a mold for injection-molding the core lens through a sprue, a runner, and a gate. After cooling, mold opening, and ejecting, the plastic core lens was produced. FIGS. 10A and 10B illustrate the produced core lens. The same parts and components as those in FIGS. 2A and 2B are designated by the same reference numerals and detailed description thereof is omitted. Specifically, meniscus lenses were made such that each lens was rounded-rectangular, the height, indicated at 31, of the core lens was 16 mm, the width, indicated at 32, thereof was 18 mm, an optical effective area in the lens was rounded-rectangular, the height, indicated at 35, of the optical effective area was 10 mm, the width, indicated at 36, thereof was 12 mm, and the thickness of middle part of the lens was 6 mm.

Subsequently, each core lens was inserted into the mold for molding the plastic optical element. At this time, the positions of gates were arranged such that the angles θ formed by the line segments AB and the line segments AC in the plastic optical elements to be molded were 180 degrees, 135 degrees, and 90 degrees.

Next, plastic for coating was poured through the sprue, the runner, the gate, and the divergent coating rib such that the plastic simultaneously ran onto the first and second optical surfaces of each core lens. After cooling, mold opening, and ejecting, the plastic optical elements were produced. Thus, the plastic optical elements having the angles θ, each formed by the line segment AB and the line segment AC, of 180 degrees, 135 degrees, and 90 degrees were obtained. FIGS. 9A to 9C illustrate the obtained plastic optical elements. The same parts and components as those in FIGS. 5A and 5B are designated by the same reference numerals and detailed description thereof is omitted. The height, indicated at 29, of each plastic optical element and the width, indicated at 30, thereof were the same as the height 31 of the core lens and the width 32 thereof, respectively. In addition, each of the thicknesses of the molded portion, serving as the plastic coatings, covering the first and second optical surfaces of each core lens was 3 mm.

COMPARATIVE EXAMPLE 2

The positions of gates each located when the corresponding core lens was inserted into the mold for molding the plastic optical element were arranged such that the angles θ formed by the line segments AB and the line segments AC in the plastic optical elements to be molded were 45 degrees and 0 degree. Regarding other conditions, the plastic optical elements were produced in the same way as Example 2.

Table 2 illustrates the relationship between the formed angles θ and birefringences in the plastic optical elements according to Example 2 and Comparative Example 2.

TABLE 2 formed angles θ and birefringences of obtained composite plastic optical elements in Example 2 and Comparative Example 2

| | Formed angle θ | | | | |
|---|---|---|---|---|---|
| | 180 degrees | 135 degrees | 90 degrees | 45 degrees | 0 degrees |
| Birefringence | Good | Good | Good | Not good | Not good |

The obtained results indicate that birefringence was good when the angle θ formed by the line segment AB and the line segment AC was greater than or equal to 90 degrees and was less than or equal to 180 degrees. Accordingly, it was found that as long as the formed angle θ is set in the range of 90 degrees to 180 degrees when viewed in the optical axis direction, a plastic optical element with good birefringence can be obtained. In Example 2 and Comparative Example 2, cycloolefin resin was used as a material for the core lenses 2 and the plastic coatings 11. Any material may be used for embodying the present invention as long as the material is resin for optical application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-261604, filed Nov. 24, 2010, which is hereby incorporated by reference herein in its entirety.

The invention claimed is:

1. A plastic optical element comprising:
a core lens; and
a molded portion disposed on the surface of the core lens, the molded portion serving as a plastic coating,
wherein the core lens has a rib portion, the rib portion having a gate corresponding part of the core lens,
wherein the molded portion has a rib portion, the rib portion having a gate corresponding part of the molded portion,
wherein an angle formed by a line segment that connects the rib portion of the core lens to the center of the core lens and a line segment that connects the rib portion of the molded portion to the center of the core lens is greater than or equal to 90 degrees and is less than or equal to 180 degrees when viewed in the optical axis direction of the plastic optical element, and
wherein an outer diameter of the plastic optical element excluding the rib portion is substantially the same as that of the core lens.

2. The plastic optical element according to claim 1, wherein the core lens and the molded portion include the same material.

3. A method of making a plastic optical element including a core lens and a plastic coating disposed on the surface of the core lens, the method comprising:
pouring plastic into a cavity through a gate to mold the core lens; and
pouring plastic from a position to coat the surface of the core lens with the plastic that serves as the plastic coating such that an outer diameter of the plastic optical element excluding the rib portion is substantially the same as that of the core lens, the position being a rib portion and being located such that an angle formed by a line segment that connects the position to the center of the core lens when viewed in the optical axis direction of the core lens and a line segment that connects the center of the core lens to a gate corresponding part of the core lens when viewed in the optical axis direction is greater than or equal to 90 degrees and is less than or equal to 180 degrees.

4. The method according to claim 3, wherein the surface of the core lens has at least a first optical surface, a second optical surface, and a non-optical surface, and the plastic is poured such that the plastic runs from the non-optical surface onto the first and second optical surfaces.

5. The method according to claim 4, wherein in the case where the shape of the first or second optical surface of the core lens is rectangular, rounded-rectangular, or oval, the plastic is poured from a short side of the shape.

6. A plastic optical element comprising:
a core lens;
a first molded portion disposed on the surface of the core lens, the molded portion serving as a plastic coating; and
a second molded portion disposed on the surface of the first molded portion, the second molded portion serving as a plastic coating,
wherein each of angles formed by a line segment that connects a gate corresponding part of the core lens to the center of the core lens, a line segment that connects a gate corresponding part of the first molded portion to the center of the core lens and a line segment that connects a gate corresponding part of the second molded portion to the center of the core lens is greater than or equal to 90 degrees and is less than or equal to 180 degrees when viewed in the optical axis direction of the plastic optical element.

7. The plastic optical element according to claim 6, wherein the shape of the plastic optical element is circular, elliptical, oval, or polygonal when viewed in the optical axis direction.

8. The plastic optical element according to claim 6, wherein the shape of the plastic optical element is circular when viewed in the optical axis direction, and each of the angles is 120 degrees.

* * * * *